Jan. 8, 1929.

P. S. KNITTEL 1,698,268

PULVERIZING MACHINE

Filed May 21, 1927

INVENTOR

Paul S. Knittel

Patented Jan. 8, 1929.

1,698,268

UNITED STATES PATENT OFFICE.

PAUL S. KNITTEL, OF JERSEY CITY, NEW JERSEY.

PULVERIZING MACHINE.

Application filed May 21, 1927. Serial No. 193,212.

This invention relates to rotary pulverizing machines of the type illustrated in the Elzemeyer-Knittel Patent 1,520,228, dated Dec. 23, 1924. In a pulverizer of the type shown in said Elzemeyer-Knittel patent, the plurality of fingers or casing is so located that the fulcrum point is placed outside the machine and the material can collect between the fingers or casing and the protecting edge of the machine proper or of the yieldable gate so that the fingers or casing will be prevented from returning to their proper position. This prevents the holding of the material in the machine, allowing the same to pass through the tips of the fingers and the edge of the stationary grinding sectors. This action produces a large amount of oversize in the product, requiring the returning of the same for re-grinding, therefore, the capacities of the machines are limited and extra machinery is required for returning this material to the grinding room of the machine.

The principal object of the present invention is to place the flexible elements of the grinding concaves so that material cannot prevent the fingers from returning to the original position. Other objects are to increase the grinding surface of the fingers in contact with the rotating elements of the machine and increasing the movement of the fingers by the oversize or foreign material in the machine, by placing the flexible grinding surface nearer and above the center of the machine.

Figure 1:
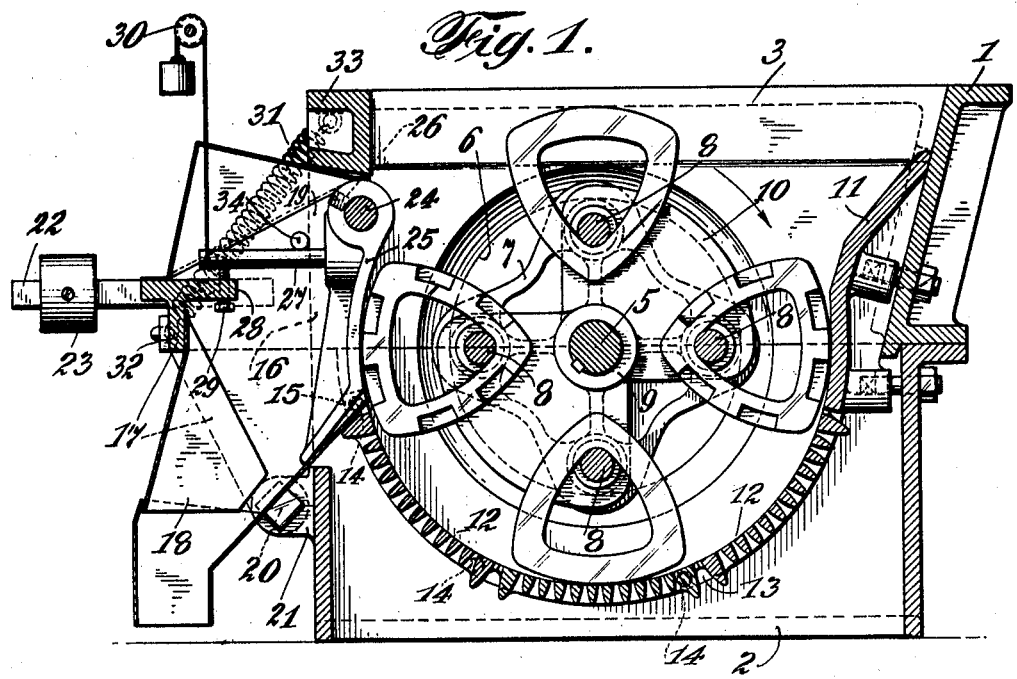
Figure 2:
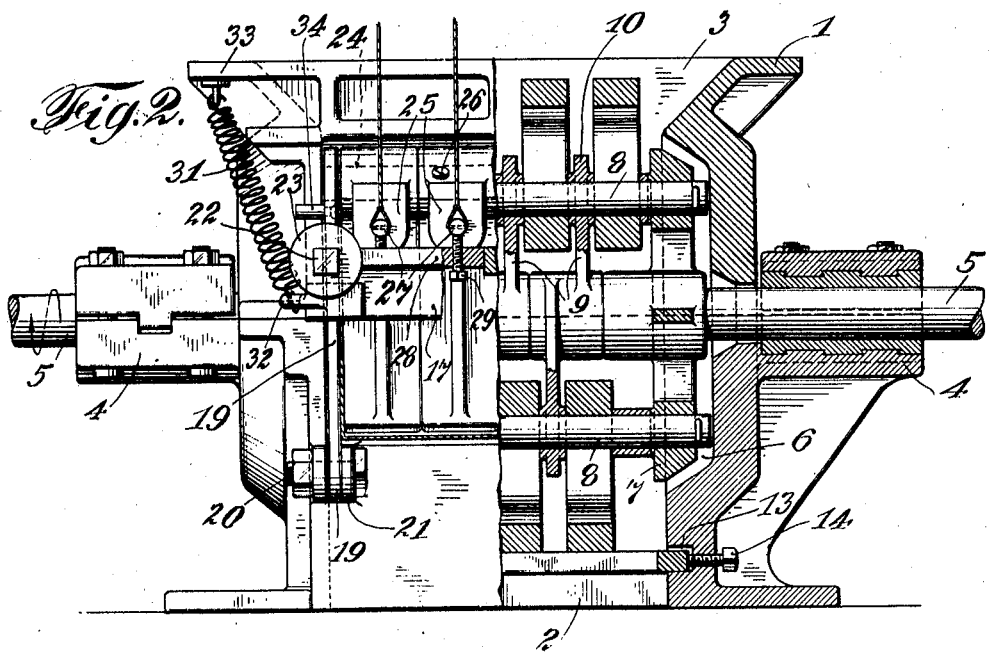

In the accompanying drawing wherein like numerals refer to like parts wherever they occur, Fig. 1 is a vertical transfer section through a pulverizer provided with an automatic discharge embodying my invention. Fig. 2 is a rear elevation of the machine, partly in sections.

Referring to the accompanying drawing, my invention is illustrated in connection with a pulverizing machine comprising an upper casing 1 and a lower casing 2. The upper casing 1 is provided with a feed opening or hopper 3 through which the material to be pulverized is fed; and the lower section 2 has an open bottom through which the pulverized material is discharged. The side walls of the lower casing are provided with suitable bearing boxes 4 for rotatably supporting the ends of the main shaft 5. Mounted on the shaft 5 in a circular recess 6 formed in each side of the walls of the pulverizer, are end plates or disks 7 which are connected to each other by a series of circumferentially spaced rods 8. Mounted on the rods 8 are grinding mediums as rings, hammers or ring sectors. Mounted on the shaft 5 between the circular end plates 7 are spiders 9. Their radially extending sectors 10 are perforated to receive the supporting rods 8, thus constituting supports for said rods intermediate their ends. The radially extending sectors also act as spacers for the different types of grinding mediums. The hub portion of the sectors are keyed to the shaft 5 and abut against each other thereby spacing the arms of the sectors the desired distance apart. The upper casing 1 is provided with a grinding and breaker plate 11 and the lower casing supports the perforated grinding concaves 12 in close proximity to the paths of the outermost portions of the grinding mediums carried on the rods 8. The grinding concaves are supported at each end of the arcuate grooves 13 in the side walls of the lower casing. The grinding concaves are kept in place by set screws 14 passing through the side of the lower housing and by washers 15 placed in the groove 13 at the outer edge of the rearmost grinding concave. The rear end of the pulverizer has an opening 16 which is provided with a hinged apron or gate 17 whose rear wall is formed by sheet iron dust covers allowing an opening 18 through which material can be discharged. The gate extends from side to side of the pulverizer and the side walls 19 of the gate 17 are extended into the pulverizer parallel with the side walls of the upper and lower housing so that no material can pass out between the two surfaces. The side walls 19 are mounted on horizontal pivots 20 supported in brackets 21 being part of the lower housing 2 whereby said gate is adapted for vertically swinging movement towards and away from the pulverizer. On each side wall 19 are riveted levers 22 provided with counterweights 23 and which have a counter-balancing effect on the gate tending to swing the same to an open position. The action of the counterweights and the weight of the gate is counter-balanced by springs 31 fastened on the side walls 19 of the gate 17 with hook 32 and at the housing of the pulverizer in flange 33. In the side walls 19, the shaft 24 carrying the flexible grinding sections or fingers 25, is supported. The fingers 25 are spaced on shaft 24 so that they can swing free and away from the grinding concaves. The hub portion of the fingers abut against each other thereby spacing the same to swing free of each other. One of the fingers is equipped with set screws 26 so that the shaft 24 is kept in position. In the rear of the finger hub a counter-weight lever 27 is placed reaching over the main rib 28 of the gate 17. Set screws 29 in the rib 28 will adjust the position of the finger 25 through the lever 27 with regard to the grinding concave. Stud 34 on each side wall 19 of apron 17 by contact with the housing walls limits the movement of apron 17 in the direction towards the center of the machine.

It is to be particularly noted that the shaft or fulcrum 24 for the fingers 25 is located inwardly of the hinge axis 20 of the gate 17 while the counterweights 23 connected with said gate are positioned outwardly of this hinge axis. The weight of the fingers 25 in conjunction with springs 31, thus normally overcome the gravitational force of the weights 23 and retain the gate in its closed position. In case an increase in the resistance of the finger 25 against the action of the machine is required, counter-weights can be placed on the rods 27. But in case the resistance of the finger 25 is required to be diminished, counter-weights acting over small pulleys 30, can be connected through cable with the rods 27, counter-balancing the weight of the fingers. In the event that foreign material such as pieces of metal or other exceedingly hard substances are contained in the material to be fed into the pulverizer, such foreign material is engaged by the grinding mediums and carried around to the yieldable grate section formed by the curved inner faces of the pivotally mounted levers or fingers 25 and is thus forced against said fingers; whereupon one or more of said fingers are forced to move an amount sufficent to form an opening through which such substances are ejected from the grinding area of said pulverizer. As the position of the supporting shaft 24 of said fingers 25 allows the total length of the finger to be exposed to the centrifugal force of the foreign material contained in the machine, even smaller pieces of foreign material will have the power to move the fingers out of the way. At the same time, the position of the finger will facilitate the removal or the ejection on account of its position above or outside of the most extended part of the revolving center of the machine.

In the motion of the finger the hub of the same exposed to the rotating action of the machine turns around the shaft 24 allowing the cleaning of the hub of any adhering material by the action of the material in the machine. Therefore, the returning of the finger 25 to its original position is facilitated by the machine itself, preventing the discharge of the product through the finger-tips and the edge of the last section of the stationary grinding concave. In the event of overfeeding or overcrowding, the excess material causes an increased pressure on the fingers, thereby causing said fingers to move an amount sufficiently to permit the discharge of the excess material from the grinding area.

The larger leverage brought on by the form of the finger and the location of the fulcrum point, facilitates this action so that in case the amount of the excess material is sufficient, the pressure on all the fingers will also overcome the counterweight action of the fingers with respect to the weights 23, thereby causing the hinged apron or gate 17 to swing outwardly under the action of the weights 23 for a sufficient distance to permit the excess material to pass through the opening 16 of the housing, some of said material being discharged through the opening 18 of the gate.

The extreme outward action of the apron 17 is counter-acted by spring 31 on each side of the machine, connecting the flanges of the housing 1 through the hook bolt 32 with the apron. In case the apron swings out too far so that the counter-balancing action of the fingers does not allow the closing of the machine by the apron, the spring 31 acts and pulls in the apron sufficiently so that the counteraction of the fingers 25 will close the machine again.

It is evident that changes may be made without departing from my invention and I do not wish to be limited to the precise construction shown and described. For instance, if desired, a counter-weighted grate section may be used instead of the series of independently counter-weighted fingers shown and described.

What is claimed is:

1. In a pulverizing machine, a casing having a concave grinding grate, rotary means mounted within the casing and coacting with said grate, said casing at one end of the grate having a material discharge outlet, and a plurality of pivoted fingers normally closing said outlet and fulcrumed at their upper ends upon an axis positioned substantially in line with the extended arc of the concave grate and said fingers having concave inner faces normally positioned in the same arc as the inner face of the grinding grate.

2. In a pulverizing machine, a casing having a concave grinding grate, rotary means mounted in the casing to coact with said grate, said casing having a material outlet at one end of the grate, a plurality of pivoted fingers constituting a continuation of said grate fulcrumed upon an axis at their upper ends positioned above the horizontal center line of said rotary means and swinging by gravity to a normal position to close said outlet, and counterbalancing means connected with said fingers and tending to move the same towards an open position.

3. In a pulverizing machine, a casing having a concave grinding grate and rotary means mounted in said casing to coact with the grate, said casing having a material outlet at one end of the grate, a discharge gate hingedly mounted on the casing at the lower side of said opening, said gate having weight means at one side of its hinge axis tending to move the gate towards an open position, and a plurality of fingers mounted on the gate at the opposite side of its hinge axis counterbalancing said weight means to normally retain the gate in a closed position and also closing said material discharge opening, said fingers being yieldably movable under excess pressure of the material to permit of its passage through said opening.

4. In a pulverizing machine, a casing having a concave grinding grate and rotary means mounted in said casing to coact with the grate, said casing having a material outlet at one end of the grate, a discharge gate hingedly mounted on the casing at the lower side of its hinge axis tending to move the gate towards an open position, and a plurality of fingers mounted on the gate at the opposite side of its hinge axis counterbalancing said weight means to normally retain the gate in a closed position and also closing said material discharge opening, said fingers being yieldably movable under excess pressure of the material to permit of its passage through said opening, and additional means supplementing the counterbalancing action of said fingers and adapted to return the gate to its normal position, when the counterbalancing action of the fingers is overcome by excessive pressure of the material thereon.

5. In a pulverizing machine, a casing having a concave grinding grate and rotary means mounted in said casing to coact with the grate, said casing having a material outlet at one end of the grate, a discharge gate hingedly mounted on the casing at the lower side of said opening, said gate having weight means at one side of its hinge axis tending to move the gate towards an open position, and a plurality of fingers mounted on the gate at the opposite side of its hinge axis counterbalancing said weight means to normally retain the gate in a closed position and also closing said material discharge opening, said fingers being yieldably movable under excess pressure of the material to permit of its passage through said opening, and springs connected to said gate supplementing the counterbalancing action of said fingers and operating to return the gate to normal position when said counterbalancing action is overcome by excessive pressure of the material against said fingers.

6. In a pulverizing machine, a casing having a concave grinding grate and rotary means mounted in the casing to coact with said grate, said casing having a material outlet opening at one end of said grate, a discharge gate for the material hingedly mounted upon the casing at the lower side of said opening, weight means connected with the gate at one side of its hinge axis tending to move the same to an open position, and a plurality of concave fingers forming part of the grinding grate fulcrumed at their upper ends within the gate on an axis positioned above the horizontal center line of said rotary means, said fingers being wholly positioned upon the opposite side of the hinge axis of said gate and counteracting the gravity force of said weight means to normally hold the gate in a closed position.

7. In a pulverizing machine, a casing having a concave grinding grate and rotary means mounted in the casing to coact with said grate, said casing having a material outlet opening at one end of said grate, a discharge gate for the material hingedly mounted upon the casing at the lower side of said opening, weight means connected with the gate at one side of its hinge axis tending to move the same to an open position, and a plurality of concave fingers forming part of the grinding grate fulcrumed at their upper ends within the gate on an axis positioned above the horizontal center line of said rotary means, said fingers being wholly positioned upon the opposite side of the hinge axis of said gate and counteracting the gravity force of said weight means to normally hold the gate in a closed position, and additional adjustable means for counterbalancing gravity movement of the respective fingers to their normal positions relative to the grate.

PAUL S. KNITTEL.